(12) United States Patent
Pennello

(10) Patent No.: US 12,015,526 B2
(45) Date of Patent: Jun. 18, 2024

(54) MIXED-PRECISION NEURAL NETWORKS

(71) Applicant: Synopsys, Inc., Mountain View, CA (US)

(72) Inventor: Thomas Pennello, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 283 days.

(21) Appl. No.: 17/246,156

(22) Filed: Apr. 30, 2021

(65) Prior Publication Data

US 2021/0377122 A1 Dec. 2, 2021

Related U.S. Application Data

(60) Provisional application No. 63/030,300, filed on May 26, 2020.

(51) Int. Cl.
*H04L 41/0896* (2022.01)
*G06F 16/22* (2019.01)
(Continued)

(52) U.S. Cl.
CPC ...... *H04L 41/0896* (2013.01); *G06F 16/2219* (2019.01); *G06N 3/08* (2013.01); *G06N 20/00* (2019.01)

(58) Field of Classification Search
CPC ................ H04L 41/0896; H04L 41/08; H04L 41/0895; G06N 20/00; G06N 3/08;
(Continued)

(56) References Cited

U.S. PATENT DOCUMENTS

2019/0130580 A1* 5/2019 Chen ...................... G06V 10/82
2020/0302318 A1* 9/2020 Hetherington ......... G06N 20/20
(Continued)

FOREIGN PATENT DOCUMENTS

| CN | 110520857 A | * | 11/2019 | ........... G06F 1/3206 |
| WO | WO-2013086384 A1 | * | 6/2013 | ....... G06F 17/30315 |
| WO | WO-2020008643 A1 | * | 1/2020 | |

OTHER PUBLICATIONS

Amulya Vishwantath, "Automatic Mixed Precision for NVIDIA Tensor Core Architecture in TensorFlow" dated Mar. 18, 2019, Developer Blog, 3 pages.
(Continued)

*Primary Examiner* — Mohammad S Adhami
*Assistant Examiner* — Jesse P. Samluk
(74) *Attorney, Agent, or Firm* — Patterson + Sheridan, LLP

(57) ABSTRACT

Techniques for mixed precision quantization of a machine learning (ML) model. A target bandwidth increase is received (302), for the ML model (114) including objects of a first data type represented by a first number of bits. The target bandwidth increase relates to changing a first portion of the objects to a second data type represented by a second number of bits different from the first number of bits (310). The method further includes sorting the objects in the ML model based on bandwidth (304). The method further includes identifying the first portion of the objects to change from the first data type to the second data type, based on the target bandwidth increase and the sorting of the plurality of objects (508). The method further includes changing the first portion of the objects from the first data type to the second data type (508).

17 Claims, 10 Drawing Sheets

(51) Int. Cl.
  *G06N 3/08* (2023.01)
  *G06N 20/00* (2019.01)

(58) Field of Classification Search
  CPC ........ G06N 3/0895; G06N 3/09; G06N 3/091;
       G06N 3/092; G06N 3/094; G06N 3/096;
       G06N 3/098; G06N 3/0985; G06F
       16/2219
  USPC ......................................................... 370/252
  See application file for complete search history.

(56) References Cited

U.S. PATENT DOCUMENTS

| 2021/0208932 A1* | 7/2021 | Park | G06F 9/5027 |
| 2023/0042397 A1* | 2/2023 | Yu | G06N 3/09 |
| 2023/0118802 A1* | 4/2023 | Gong | G06N 3/08 |
| | | | 706/25 |

OTHER PUBLICATIONS

Narang, et al., "Mixed Precision Training", Feb. 15, 2018, Published as a conference paper at ICLR 2018, consists of 12 pages.

Zhang, et al., Adaptive-Precision Framework for SGD Using Deep Q-Learning, consists of 8 pages, ICCAD '18, Nov. 5-8, 2018, San Diego, CA, USA.

Jia, et al., "Highly Scalable Deep Learning Training System with Mixed-Precision: Training ImageNet in Four Minutes", Tencent Inc.1, Hong Kong Baptist University, published Jul. 30, 2018, consists of 9 pages.

Judd, et al., "Reduced-Precision Strategies for Bounded Memory in Deep Neural Nets", Published Jan. 8, 2016, Under review as a conference paper at ICLR 2016, consists of 12 pages.

Wang, et al., "Training Deep Neural Networks with 8-bit Floating Point Numbers", 32nd Conference on Neural Information Processing Systems (NeurIPS 2018), Montréal, Canada. consists of 10 pages.

Das, et al., "Mixed Precision Training of Convolutional Neural Networks Using Integer Operations", Published as a conference paper at ICLR 2018, Feb. 23, 2018, consists of 11 pages.

\* cited by examiner

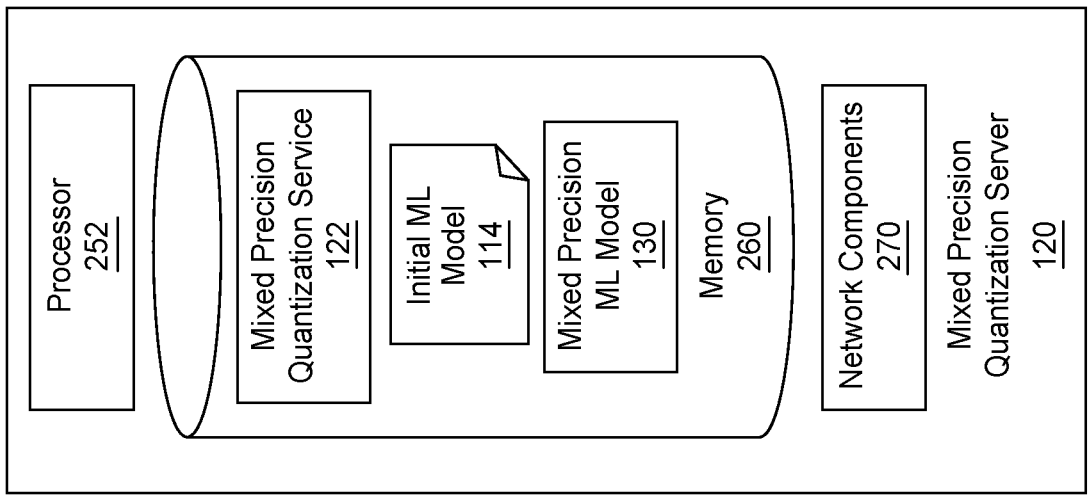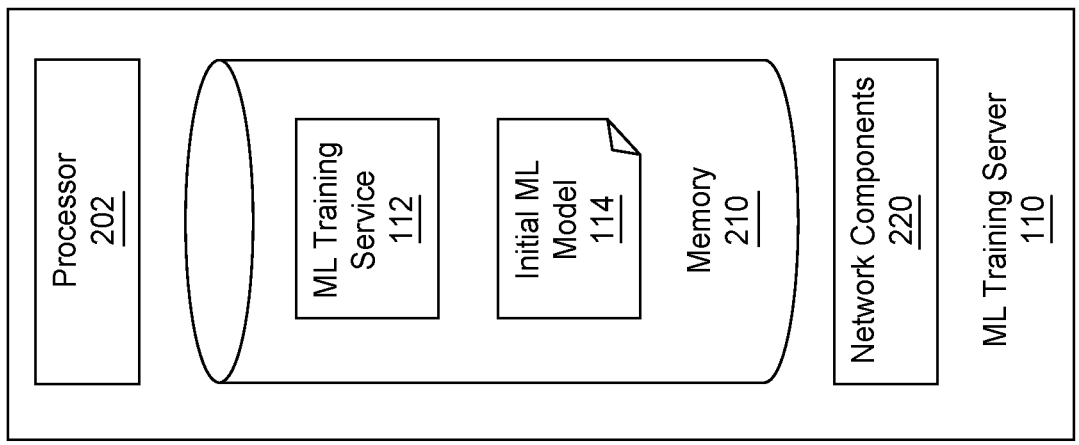
FIG. 2

```
BIG = 12                                            # Size in bits of big data type
SMALL - 8                                           # Size in bits of small data type
INCREASE - BIG/SMALL - 1                            # Potential size increase of an object
total_size = sum of objects in SMALL                # Sum of size of ML Model objects (e.g., BLOBs or weights)
expanded_size = total_size*target_increase          # Total size after increase by target percentage for O in objects sorted in increasing size:
    let size = size of O
    let delta = size*INCREASE
    if total_size + delta <= expanded_size:         # Amount added if object O increased to BIG data type
        increase O to BIG size.
        total_size += delta
    else:
        break                                       # Complete. All remaining objects remain in Small size.

| Object Num 702 | 8 Bit Size 704 | 8 Bit Sum 706 | % Total 708 | Updated Bits Used 710 | Updated Size 712 | Updated Sum 714 | % Total 716 | Total Expansion 718 | Object Type 720 |
|---|---|---|---|---|---|---|---|---|---|
| 1 | 1000 | 1000 | 0 | 12 | 1500 | 1500 | 0 | 1.500 | blob |
| 2 | 1000 | 2000 | 0 | 12 | 1500 | 3000 | 0 | 1.500 | blob |
| 3 | 2048 | 4048 | 0 | 12 | 3072 | 6072 | 0 | 1.500 | blob |
| 4 | 4096 | 8144 | 0 | 12 | 6144 | 12216 | 0 | 1.500 | weight |
| 5 | 9408 | 17552 | 0 | 12 | 14112 | 26328 | 0 | 1.500 | weight |
| 6 | 12544 | 30096 | 0 | 12 | 18816 | 45144 | 0 | 1.500 | blob |
| 7 | 16384 | 46480 | 0 | 12 | 24576 | 69720 | 0 | 1.500 | weight |
| 8 | 16384 | 62864 | 0 | 12 | 24576 | 94296 | 0 | 1.500 | weight |
| 9 | 16384 | 79248 | 0 | 12 | 24576 | 118872 | 0 | 1.500 | weight |
| 10 | 16384 | 95632 | 0 | 12 | 24576 | 143448 | 0 | 1.500 | weight |
| ... | | | | | | | | | |
| 229 | 262144 | 25462672 | 27 | 12 | 393216 | 38194008 | 36 | 1.500 | weight |
| 230 | 262144 | 25724816 | 28 | 12 | 393216 | 38587224 | 36 | 1.500 | weight |
| 231 | 262144 | 25986960 | 28 | 12 | 393216 | 38980440 | 37 | 1.500 | weight |
| 232 | 262144 | 26249104 | 28 | 8 | 262144 | 39242584 | 37 | 1.495 | weight |
| 233 | 262144 | 26511248 | 28 | 8 | 262144 | 39504728 | 37 | 1.490 | weight |
| 234 | 262144 | 26773392 | 29 | 8 | 262144 | 39766872 | 37 | 1.485 | weight |
| ... | | | | | | | | | |
| 366 | 2359296 | 88680336 | 95 | 8 | 2359296 | 101673816 | 96 | 1.147 | weight |
| 367 | 2359296 | 91039632 | 97 | 8 | 2359296 | 104033112 | 98 | 1.143 | weight |
| 368 | 2359296 | 93398928 | 100 | 8 | 2359296 | 106392408 | 100 | 1.139 | weight |

FIG. 7A

| Object Num 702 | 8 Bit Size 704 | 8 Bit Sum 706 | % Total 708 | Updated Bits Used 710 | Updated Size 712 | Updated Sum 714 | % Total 716 | Total Expansion 718 | Object Type 720 |
|---|---|---|---|---|---|---|---|---|---|
| 1 | 24 | 24 | 0 | 12 | 36 | 36 | 0 | 1.5 | blob |
| 2 | 24 | 48 | 0 | 12 | 36 | 72 | 0 | 1.5 | blob |
| 3 | 96 | 144 | 0 | 12 | 144 | 216 | 0 | 1.5 | blob |
| 4 | 96 | 240 | 0 | 12 | 144 | 360 | 0 | 1.5 | blob |
| 5 | 128 | 368 | 0 | 12 | 192 | 552 | 0 | 1.5 | blob |
| 6 | 216 | 584 | 0 | 12 | 324 | 876 | 0 | 1.5 | blob |
| 7 | 216 | 800 | 0 | 12 | 324 | 1200 | 0 | 1.5 | blob |
| ... | | | | | | | | | |
| 81 | 184832 | 3195772 | 19 | 12 | 277248 | 4793656 | 26 | 1.5 | blob |
| 82 | 184832 | 3380604 | 20 | 8 | 184832 | 4978488 | 27 | 1.473 | blob |
| 83 | 184832 | 3565436 | 21 | 8 | 184832 | 5163320 | 28 | 1.448 | blob |
| 84 | 184832 | 3750268 | 22 | 8 | 184832 | 5348152 | 29 | 1.426 | blob |
| ... | | | | | | | | | |
| 109 | 1048576 | 14132796 | 84 | 8 | 1048576 | 15730680 | 86 | 1.113 | weight |
| 110 | 1179648 | 15312444 | 91 | 8 | 1179648 | 16910328 | 92 | 1.104 | weight |
| 111 | 1440000 | 16752444 | 100 | 8 | 1440000 | 18350328 | 100 | 1.095 | blob |

MIXED-PRECISION NEURAL NETWORKS

CROSS-REFERENCE TO RELATED APPLICATIONS

This application claims priority to and the benefit of U.S. Provisional Patent Application No. 63/030,300, filed May 26, 2020, which is incorporated by reference in its entirety.

TECHNICAL FIELD

The present disclosure relates to machine learning, and more specifically to neural networks using values represented in more than one precision.

BACKGROUND

Neural networks, and other machine learning (ML) models, can include variables representing numeric values. These numeric values are often represented as floating-point data types. For example, floating-point values are frequently used to represent: (1) weights, or learned values, of a certain layer in the network, such as a convolution or inner product, and (2) feature maps, also called activations or binary large objects (BLOBs). These weights and BLOBs can be used, for example, in the outputs of given layer in a neural network and the input to a subsequent layer.

Executing a neural network with floating-point values, however, can be computationally expensive (e.g., execution can be slow, and power-intensive). Many neural networks include a large number of floating-point values, and floating-point arithmetic is typically slow and consumes power. In addition, floating-point data types are typically 32 bits or larger, so loading and storing such values requires storage space and takes time. The use of floating-point values can therefore inhibit the execution of neural networks on devices with fewer available computing resources or with power limitations, including edge devices such as smartphones and tablets.

SUMMARY

Embodiments include a method. The method includes receiving a target bandwidth increase for a machine learning (ML) model including a plurality of objects of a first data type represented by a first number of bits. The target bandwidth increase relates to changing a first portion of the plurality of objects to a second data type represented by a second number of bits different from the first number of bits. The method further includes sorting the plurality of objects in the ML model based on bandwidth. The method further includes identifying the first portion of the plurality of objects to change from the first data type to the second data type, based on the target bandwidth increase and the sorting of the plurality of objects. The method further includes changing the first portion of the plurality of objects from the first data type to the second data type.

Embodiments further includes a system, including a processor and a memory storing instructions, which when executed by the processor, cause the processor to perform operations. The operations include receiving a target bandwidth increase for a neural network including a plurality of binary large objects (BLOBs) and weights of a first data type represented by a first number of bits. The target bandwidth increase relates to changing at least some of the plurality of BLOBs and weights to a second data type represented by a second number of bits different from the first number of bits. The operations further include identifying a first portion of the plurality of BLOBs and weights to change from the first data type to the second data type, based on the target bandwidth increase. The operations further include changing the first portion of the plurality of BLOBs and weights from the first data type to the second data type.

Embodiments further include a non-transitory computer readable medium including stored instructions, which when executed by a processor, cause the processor to perform operations. The operations include receiving a target performance change for a machine learning (ML) model including a plurality of objects of a first data type represented by a first number of bits. The target performance change relates to changing at least some of the plurality of objects to a second data type represented by a second number of bits different from the first number of bits. The operations further include sorting the plurality of objects in the ML model based on size. The operations further include identifying a first portion of the plurality of objects to change from the first data type to the second data type, based on the target performance change and the sorting the plurality of objects. The operations further include changing the first portion of the plurality of objects from the first data type to the second data type. The operations further include using the ML model, including the first portion of the plurality of objects changed to the second data type, to infer a result from one or more inputs.

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

FIG. 2 illustrates an ML training server and a mixed precision quantization server for using mixed precision values for an ML model, according to one embodiment.

FIG. 6 illustrates an example technique for updating an ML model to mixed precision, according to one embodiment.

FIG. 7A illustrates a table of example objects in a mixed precision ML model, according to one embodiment.

To facilitate understanding, identical reference numerals have been used, where possible, to designate identical elements that are common to the figures. It is contemplated

DETAILED DESCRIPTION

The computational expense of executing ML models (e.g., neural networks) with floating-point data types can be reduced by converting some, or all, of the floating-point values to smaller integer data types. This can reduce computational expense, but reduce accuracy. A neural network can then be executed on hardware that supports the desired integer data type (e.g., a 12-bit integer data type), making execution significantly less computationally expensive.

Further, neural network hardware can support more than one size of integer data type. For example, some hardware supports either 12-bit or 8-bit integer weights and BLOBs. A neural network could have some objects stored as a 12-bit integer data type and some as an 8-bit integer data type. This can be referred to as a mixed-precision implementation.

Typically, 8-bit integer weights are faster to load from memory into multiplier registers than 12-bit integer weights, due to their size. 8-bit integer BLOBs are also typically faster to write to memory as a layer computes its output, compared to 12-bit integer BLOBs. 8-bit integer BLOBs are also faster to load into multiplier registers, when a layer takes as input a previously-computed BLOB. Further, because 8 is a power of 2 and 12 is not, 8-bit integer loading and storing is often less complex and cheaper in hardware implementation than 12-bit integer loading and storing.

However, the fewer the bits in the representation, the less the accuracy in representing the floating-point values, which can reduce the accuracy of inference by the neural network as a whole. Sometimes, representing all numeric values in a neural network with a smaller data type (e.g., an 8-bit integer) does not provide sufficient accuracy, and so some values are represented using a smaller data type (e.g., an 8-bit integer) while others are represented using a larger data type (e.g., a 12-bit integer).

One or more embodiments disclosed herein provide techniques by which mixed-precision ML models can be chosen when two levels of precisions are possible. For example, some weights and BLOBs can be represented using the larger integer data type (e.g., a 12-bit integer data type) while the remainder can be represented using the smaller integer data type (e.g., an 8-bit integer data type). One or more techniques disclosed herein can be used to select which weights and BLOBs to represent with differing levels of precision (e.g., which to represent as 8-bit integers and which to represent as 12-bit integers).

Figure 1:
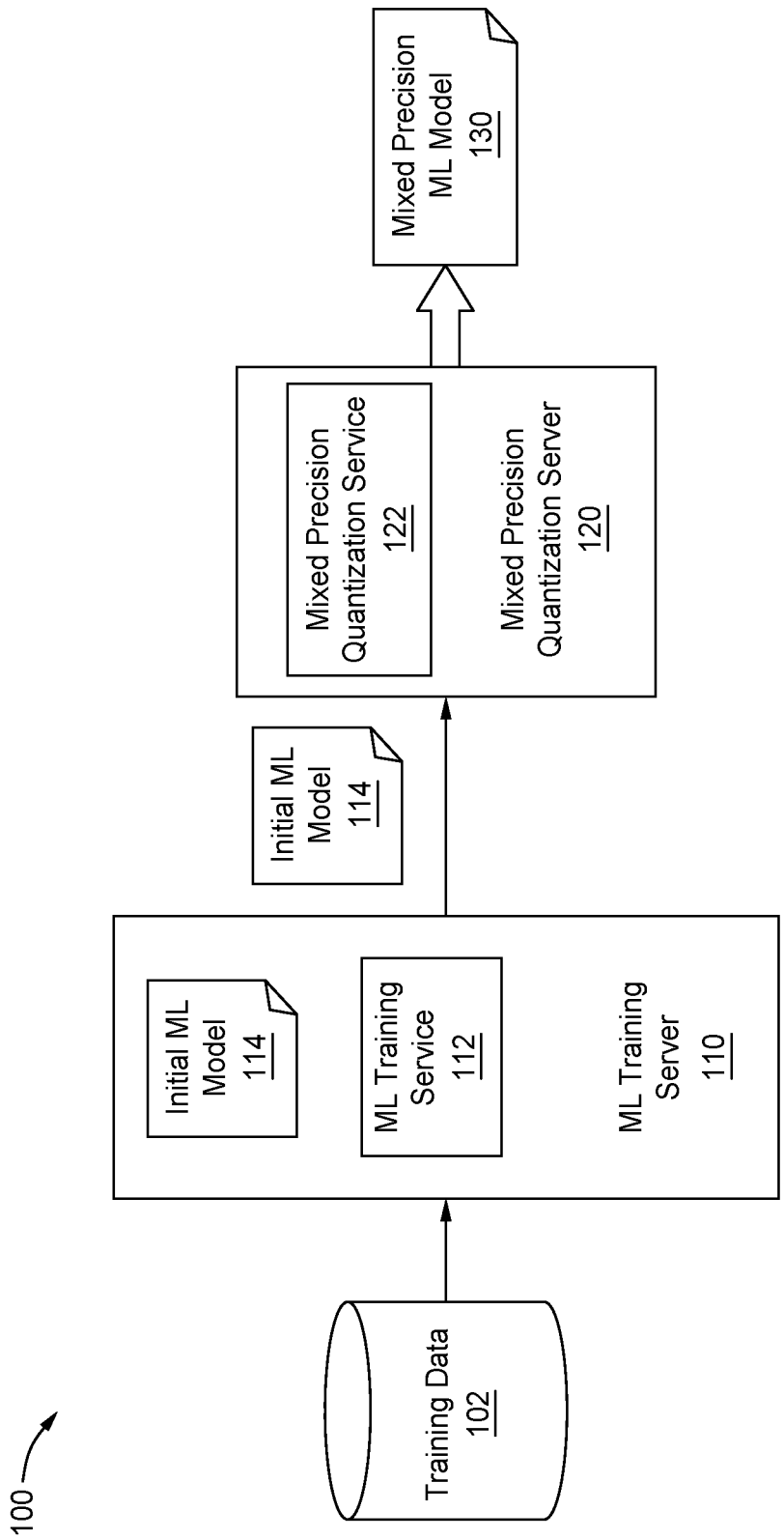
FIG. 1 illustrates using mixed precision values for an ML model, according to one embodiment.

FIG. 1 illustrates using mixed precision values for an ML model, according to one embodiment. In an embodiment, training data 102 is provided to an ML training server 110. The ML training server 110 includes an ML training service 112 and an initial ML model 114. In an embodiment, the ML training service 112 uses the training data 102 to train the initial ML model 114. For example, the ML training service 112 can convert the training data 102 into feature vectors. The ML training service 112 can use the feature vectors, along with associated attribute values, to train the initial ML model 114. This is merely one example, and any suitable training data can be used.

Further, any suitable supervised ML techniques can be used to train the floating-point ML model. For example, the initial ML model 114 can be a neural network (e.g., a convolutional neural network (CNN), an adversarial neural network, or any other suitable neural network) and can be trained using any suitable technique. FIG. 1 is merely one example.

In an embodiment, the initial ML model 114 includes variables stored as floating-point data types. For example, the initial ML model 114 can be a neural network with a large number of weights and BLOBs stored as floating-point variables. As discussed above, representing the weights and BLOBs using floating-point variables can increase accuracy, but can be computationally expensive and power intensive. Floating-point is merely one example, and the initial ML model 114 can represent numeric values using any suitable data type (e.g., a large integer data type rather than a floating-point data type).

In an embodiment, the ML training server 110 provides the initial ML model 114 to a mixed precision quantization server 120. The ML training server 110 can communicate with the mixed precision quantization server 120 using any suitable connection, including a local area network, a wide area network, the Internet, or a direct connection. Further, as discussed further below with regard to FIG. 2, in an embodiment the ML training server and mixed precision quantization server 120 can communicate using any suitable technique, including WiFi, a cellular connection, or a wired connection. Further, the training data 102 can be provided to the ML training server 110 from any suitable source. For example, the training data can be stored at remote database (e.g., a relational database), another remote storage location, or locally with the ML training server 110.

The mixed precision quantization server 120 includes a mixed precision quantization service 122. In an embodiment, the mixed precision quantization service 122 generates a mixed precision ML model 130 by changing the variable types (e.g., weights and BLOBs) in the initial ML model 114 to different data types that are less precise, and less computationally expensive. For example, initial ML model 114 can be a neural network with weights and BLOBs stored as floating-point variables. The mixed precision quantization service 122 can convert these floating-point variables to integers.

As one example, the following technique can be used: An integer I can be used to represent a floating-point value F via an implicit scale S with the equation F=I/S. In this example, floating-point values in the range of 0 to 2 can be represented in the 12-bit integer range 0 to 4095 with an implicit scale of 4095/2=2047.5. The integer value 1000 represents the floating-point value 1000/2047.5=0.488. The integer value 2000 represents the floating-point value 2000/2047.5=0.977. The integer value 4095 represents the floating-point value 4095/2047.5=2.0.

In an embodiment, the mixed precision quantization service 122 coverts floating-point variables in the initial ML model 114 to integer data types supported by hardware which will be executing the mixed precision ML model 130 during an inference stage (e.g., when using the ML model to infer a result from one or more inputs). For example, hardware could be configured to support 8-bit and 12-bit integer data types in an ML model. The mixed precision quantization service 122 can convert floating-point variables in the initial ML model 114 to a mix of 8-bit and 12-bit integers in the mixed precision ML model 130. This is discussed further below with regard to FIGS. 3-6. This is merely one example. The mixed precision quantization service 122 can convert any suitable variables, including converting a larger floating-point variable to a smaller floating-point variable (e.g., a 32 bit floating-point to a 16 bit or a 12 bit floating-point), a larger floating-point variable to a mix of a smaller floating-point variable and an integer (e.g., a 32 bit floating-point to a 16 bit floating-point and an 8 or 12 bit integer), a larger integer to a smaller integer, or any other suitable combination.

FIG. 2 illustrates an ML training server 110 and a mixed precision quantization server 120 for using mixed precision values for an ML model, according to one embodiment. In an embodiment, the ML training server 110 corresponds with the ML training server 110 illustrated in FIG. 1. The ML training server 110 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the ML training server 110 to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the ML training server 110. The program code is generally described as various functional "applications" or "modules" within the memory 210, although alternate implementations may have different functions and/or combinations of functions. Within the memory 210, the ML training service 112 facilitates training of an initial ML model 114. In an embodiment, the ML training service 112 corresponds with the ML training service 112 illustrated in FIG. 1, and the initial ML model 114 corresponds with the initial ML model 114 illustrated in FIG. 1.

In an embodiment, the mixed precision quantization server 120 corresponds with the mixed precision quantization server 120 illustrated in FIG. 1. The mixed precision quantization server 120 includes a processor 252, a memory 260, and network components 270. The processor 252 generally retrieves and executes programming instructions stored in the memory 260. The processor 252 is representative of a single central processing unit (CPU), multiple CPUs, a single CPU having multiple processing cores, graphics processing units (GPUs) having multiple execution paths, and the like.

The network components 270 include the components necessary for the mixed precision quantization server 120 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the mixed precision quantization server 120. The program code is generally described as various functional "applications" or "modules" within the memory 260, although alternate implementations may have different functions and/or combinations of functions. Within the memory 260, the mixed precision quantization service 122 facilitates converting the initial ML model 114 to a mixed precision ML model 130. In an embodiment, the mixed precision quantization service 122 corresponds with the mixed precision quantization service 122 illustrated in FIG. 1, the initial ML model 114 corresponds with the initial ML model 114 illustrated in FIG. 1, and the mixed precision ML model 130 corresponds with the mixed precision ML model 130 illustrated in FIG. 1. In an embodiment, converting the initial ML model 114 to the mixed precision ML model 130 is discussed further below with regard to FIGS. 3-6.

Figure 3:
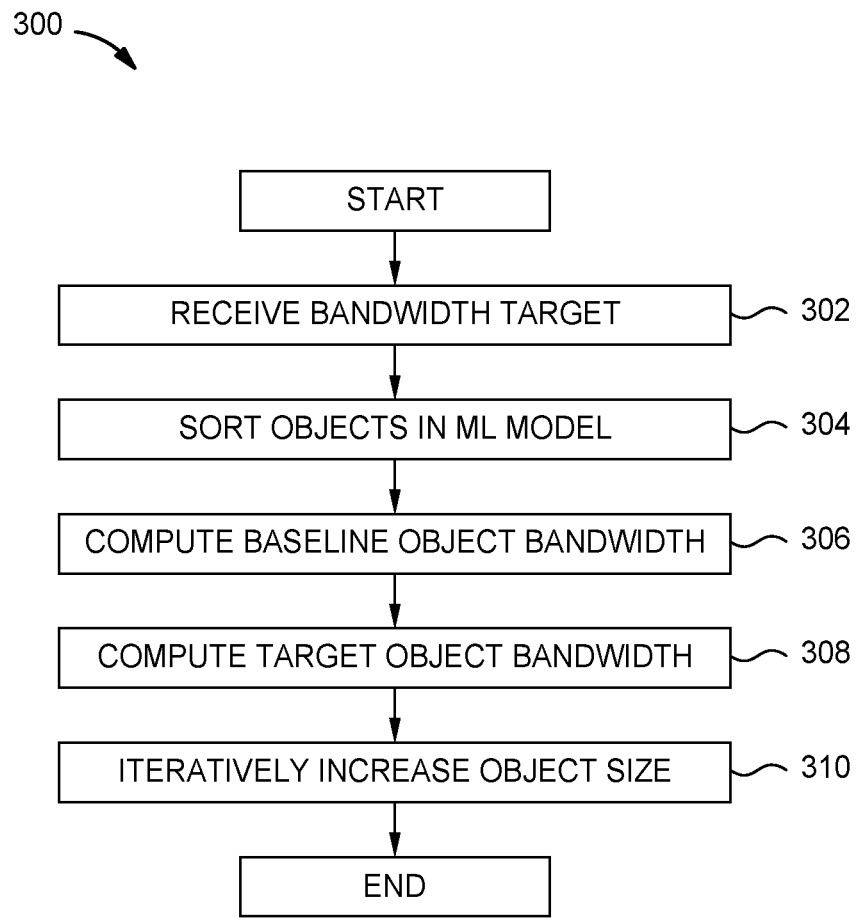
FIG. 3 is a flowchart for using mixed precision values for an ML model, according to one embodiment.

FIG. 3 is a flowchart for using mixed precision values for an ML model, according to one embodiment. At block 302, a mixed precision quantization service (e.g., the mixed precision quantization service 122 illustrated in FIG. 2) receives a bandwidth target for an ML model (e.g., for a neural network). As discussed further below, in an embodiment the bandwidth target relates to a desired bandwidth to be used for inference by the ML model (e.g., a desired size, in bits, of objects in the ML model), and allows a user (e.g., an ML model designer) to generate a preferred mixed precision implementation by balancing the impact of the mixed precision implementation on the accuracy of the ML model and on the bandwidth required for inference using the ML model. One or more techniques discussed in relation to FIG. 3 can be used to generate a mixed precision implementation for a given bandwidth target.

For example, an initial ML model (e.g., the initial ML model 114 illustrated in FIG. 2) can include objects (e.g., weights and BLOBs) represented using a larger data type (e.g., a floating-point data type). A user can quantize the initial ML model to operate on hardware that supports two smaller data types (e.g., an 8-bit integer data type and a 12-bit integer data type). The baseline bandwidth required for the ML model would be reached if all objects are set to the smaller data type (e.g., all weights and BLOBs are represented using 8-bit integers).

In an embodiment, at block 302 the user provides the mixed precision quantization service with a bandwidth target relative to this baseline: for example, the user can request a mixed precision implementation that uses 5% more bandwidth than the baseline, 10% more bandwidth than the baseline, 25% more bandwidth than the baseline, etc. This is merely one example, and the bandwidth target can instead be a defined value (e.g., a defined size limit for weights and BLOBs in the ML model), a fraction of the maximum bandwidth (e.g., a fraction of the bandwidth if all weights and BLOBs are represented using the larger data type (e.g., 12-bit integers)), or any other suitable value. As discussed further below with regard to FIG. 4, the size taken by the variables in the ML model is a proxy for bandwidth, but this is merely one example. Alternatively, or in addition, bandwidth could include qualitative differences between variables (e.g., BLOBs could be considered higher bandwidth than weights, even if the objects are the same size). Further, bandwidth is merely one example of a performance target for the ML model. In an embodiment, at block 302 the mixed precision quantization service can receive any suitable performance target.

At block 304, the mixed precision quantization service sorts objects in the ML model. For example, weights and BLOBs in a neural network can be referred to as objects. At block 304, the mixed precision quantization service sorts objects in the ML model (e.g., weights and BLOBs) by bandwidth. For example, the mixed precision quantization service can sort the objects by size, as a proxy for bandwidth. This is discussed further with regard to FIG. 4, below.

At block 306, the mixed precision quantization service computes a baseline object bandwidth. For example, as discussed above, the mixed precision quantization service can quantization the initial ML model to generate a mixed precision ML model (e.g., the mixed precision ML model 130 illustrated in FIG. 2) by changing objects represented using a larger data type (e.g., a floating-point data type) to one of two smaller data types (e.g., an 8-bit integer data type and a 12-bit integer data type). In an embodiment, the baseline object bandwidth is the smallest bandwidth possible to represent all objects in the ML model (e.g., all weights and BLOBs) using the smaller data type. For example, assuming the mixed precision ML model uses an 8-bit and a 12-bit integer data type, the baseline object bandwidth would be the memory size (e.g., in bits) used represent all objects in the initial ML model as 8-bit integers (e.g., instead of floating-point values).

At block 308, the mixed precision quantization service computes a target object bandwidth. In an embodiment, the target object bandwidth provides an upper bound for the bandwidth of the mixed precision ML model. For example, assume the initial ML model represents objects (e.g., weights and BLOBs) using a floating-point data type, and assume the mixed precision ML model uses a combination of 8-bit and 12-bit integers in place of the floating-point values. The baseline object bandwidth, discussed above in relation to block 306, is the bandwidth used to represent all floating-point objects as 8-bit integers (e.g., the size of these objects represented as 8-bit integers). The target object bandwidth is the bandwidth target received at block 302 (e.g., a percentage increase) applied to this baseline. For example, assuming the baseline object bandwidth is 1 MB, and the bandwidth target is a 10% increase. The target object bandwidth is 1*1.1=1.1 MB.

At block 310, the mixed precision quantization service iteratively increases object size. For example, the mixed precision quantization service can start by assuming all objects (e.g., all weights and BLOBs) should be converted to the smaller data type (e.g., 8-bit integer). The mixed precision quantization service can then iteratively select objects to increase from the smaller data type to the larger data type (e.g., from 8-bit integers to 12-bit integers) while remaining below the target object bandwidth. In an embodiment, the mixed precision quantization service can use the sorted collection of objects generated at block 304 to select which objects should be increased in size. For example, the mixed precision quantization service can start with objects taking less bandwidth, and iteratively increase object size for objects taking more and more bandwidth. This is discussed further with regard to FIG. 5, below.

In an embodiment, a user can run the techniques disclosed in relation to FIG. 3 iteratively, with a number of different bandwidth targets. For example, the user can use these techniques to generate a series of mixed precision ML models meeting different bandwidth targets, and can analyze the resulting mixed precision ML models for accuracy (e.g., using defined testing metrics). The user can then select the mixed precision ML model that best balances improved bandwidth with acceptable accuracy (e.g., because lower bandwidth models are likely to be less accurate because of the loss of precision in weights and BLOBs in the model).

Figure 4:
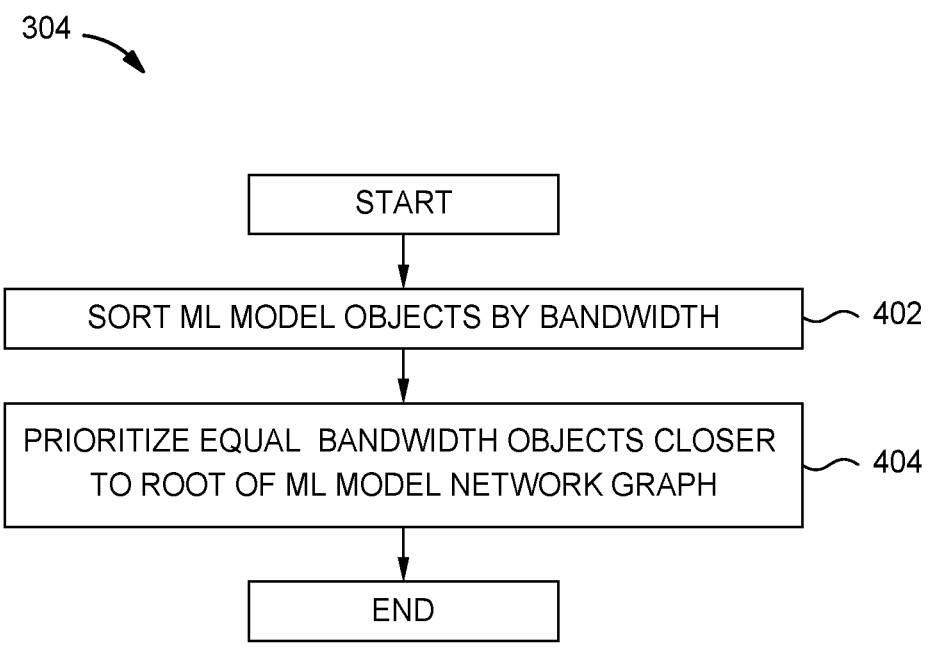
FIG. 4 is a flowchart for sorting objects for updating mixed precision values for an ML model, according to one embodiment.

FIG. 4 is a flowchart for sorting objects for updating mixed precision values for an ML model, according to one embodiment. In an embodiment, FIG. 4 corresponds with block 304 in FIG. 3, discussed above. At block 402 a mixed precision quantization service (e.g., the mixed precision quantization service 122 illustrated in FIG. 2) sorts objects in an initial ML model (e.g., the initial ML model 114 illustrated in FIG. 2) by bandwidth. As discussed above, in an embodiment size is used as a proxy for bandwidth. In this embodiment, the mixed precision quantization service sorts the objects (e.g., weights and BLOBs) in the initial ML model by size.

For example, the mixed precision quantization service can sort the objects by size from smallest to largest. That is, the mixed precision quantization service can identify the size of each object in the initial ML model (e.g., the total size of all instances of that object in the ML model in bits), and can sort the objects from smallest to largest (e.g., from the smallest total size of all instances of the object to the largest total size of all instances of the object). Size is merely a proxy for bandwidth, and alternatively, or in addition, the mixed precision quantization service can sort the objects based on other criteria. For example, assume BLOBs are considered to be higher bandwidth than weights. BLOB size could be multiplied by an adjustment factor before sorting BLOBs and weights, increasing the bandwidth of BLOBs relative to weights. This adjustment factor could be determined in any suitable manner (e.g., through experimentation, or from prior model experience). As another example, weights or BLOBs in a given layer could be considered higher (or lower) bandwidth than other weights or BLOBs, and could be multiplied by an adjustment facture. These are merely examples, and weights could instead be considered higher bandwidth than BLOBs, or other criteria could be used.

At block 404, the mixed precision quantization service prioritizes equal bandwidth objects closer to the root of the ML model network graph. In an embodiment, the initial ML model can be a neural network represented by a network graph expressing the proximity of each object on the initial ML model to the root (or roots). Objects further away from the root(s) of the network graph may be dependent on objects closer to the root(s). In this embodiment, priority can be given to objects closer to the root(s) to increase accuracy of the representation of these objects. As one example, if two objects are considered to have equal bandwidth at block 402, the object closer to the root(s) of the network graph can be placed first in the sort, so that object is more likely to be represented using a larger data type and more likely to be more accurate. Equal bandwidth is merely one example. Alternatively, or in addition, the mixed precision quantization service can prioritize objects closer to the root of the ML model network graph when comparing objects with similar, but not exactly equal, bandwidth (e.g., when objects are within a tolerance threshold of each other).

For example, assume the mixed precision quantization service converts floating-point values in an initial ML model to a mix of 12-bit and 8-bit integers. Objects closer to the root(s) of the network graph can be given priority for conversion to 12-bit integers (as opposed to 8-bit integers) to avoid compounding inaccuracies from the root(s) of the network graph to the outer nodes. By making objects closer to the root(s) more precise, these objects are more accurate and fewer inaccuracies are compounded through nodes further down the graph. Assuming two objects are considered to have the same bandwidth at block 402, at block 404 the object that is closer to the root(s) of the network graph is placed first in the sort so that it is more likely to be represented by a 12-bit integer. After the sorting is completed, the mixed precision quantization service proceeds compute the baseline object bandwidth (e.g., as illustrated at block 306 in FIG. 3).

Figure 5:
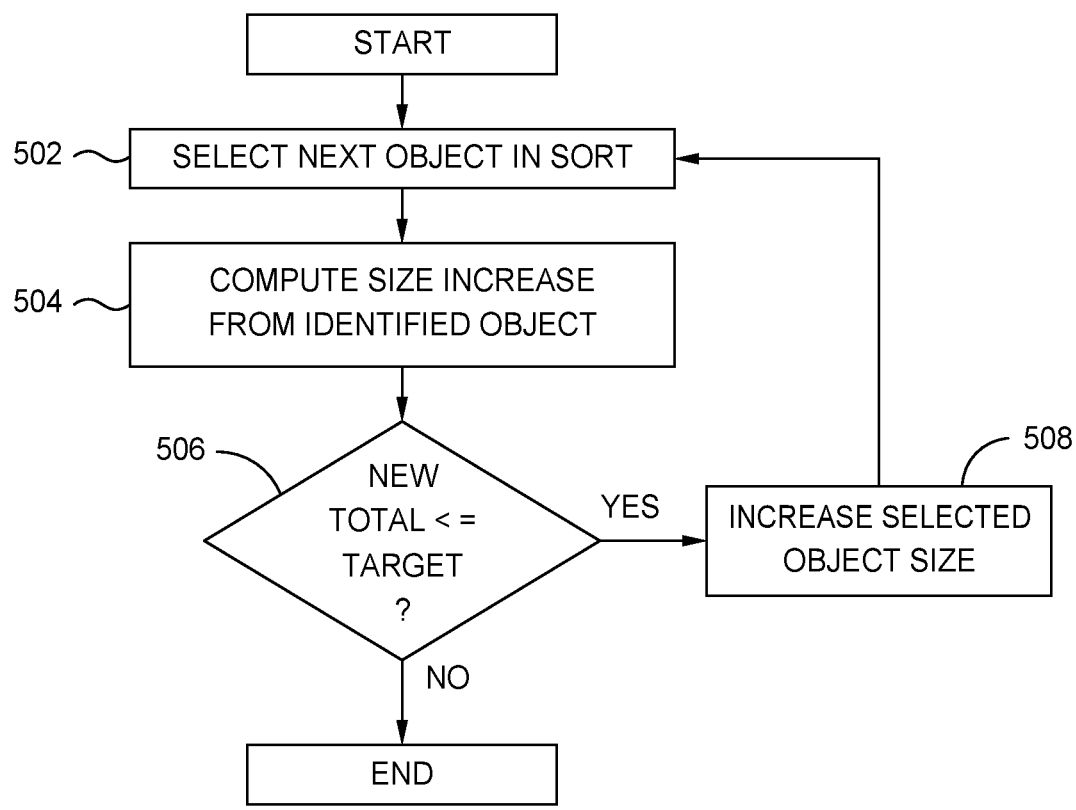
FIG. 5 is a flowchart for increasing object size for updating mixed precision values for an ML, according to one embodiment.

FIG. 5 is a flowchart for increasing object size for updating mixed precision values for an ML model, according to one embodiment. In an embodiment, FIG. 5 corresponds with block 310 in FIG. 3, discussed above. At block 502 a mixed precision quantization service (e.g., the mixed precision quantization service 122 illustrated in FIG. 2) selects the next object in a sorted list of objects from the initial ML model (e.g., the initial ML model 114 illustrated in FIG. 2). For example, the mixed precision quantization service can generate the sorted list of objects (e.g., weights and BLOBs) at block 304 illustrated in FIG. 3. As noted above, in an embodiment the list is sorted from lowest bandwidth to highest bandwidth (e.g., smallest size to largest size), with proximity to root(s) of a network graph used to break ties as described in FIG. 4.

At block 504, the mixed precision quantization service computes the size increase, for the ML model as a whole, if the selected object is increased from the smaller data type (e.g., 8-bit integer) to the larger data type (e.g., 12-bit integer). For example, assume the selected object has a size of 1 MB if represented as an 8-bit integer. The mixed precision quantization service can determine that the selected object would have a size of 1.5 MB if represented as a 12-bit integer. This is an increase of 0.5 MB.

At block 506, the mixed precision quantization service determines whether the size increase makes the total size of the objects in the ML model less than or equal to the target size. If no, and the total size of objects would be greater than the target total size if the selected object is increased in size, and so the flow ends. If yes, and the total size of objects would be less than the target total size if the selected object is increased in size, then the flow proceeds to block 508.

At block 508, the mixed precision quantization service increases the size of the selected object. The flow then returns to block 502. At block 502 the mixed precision quantization service selects the next object in the sorted list, and proceeds to block 504.

For example, as discussed above in relation to FIG. 3, an ML model could be targeted for a 10% total size increase as part of a mixed precision quantization. If the objects in the ML model have a total size of 10 MB if represented as a smaller data type, the target total size would be 11 MB, allowing for an increase of 1 MB by converting objects from the smaller data type to the larger data type. Assume that, as discussed above, increasing the selected object from an 8-bit integer to a 12-bit integer would increase the size of the object in the ML model by 0.5 MB. If the size of objects would remain below the target after increasing the selected object size, then the object is increased from 8-bit integer to 12-bit integer. If not, the flow ends.

FIG. 6 illustrates an example technique for updating an ML model to mixed precision, according to one embodiment. In an embodiment, FIG. 6 illustrates pseudocode 600 representing techniques discussed above in relation to FIGS. 3-5. The "#" symbol is used to denote an explanatory comment. In the example of FIG. 6, objects are increased in size from a "SMALL" 8-bit data type (e.g., an 8-bit integer) to a "BIG" 12-bit data type (e.g., a 12-bit integer). The "INCREASE" for a given object, from SMALL to BIG, is 0.5 (12/8−1). The "total_size" is the sum of the object sized in an initial ML model if all objects are represented using the SMALL data type. The "expanded_size" is the total size after applying the target increase (e.g., as discussed above in relation to block 302 in FIG. 3).

The technique iterates through a list of objects from the initial ML model, sorted from smaller to larger. This sorting is discussed above in relation to block 304 in FIG. 3 and FIG. 4. For each object, the "delta" is determined. This is the total size increase if the selected object is converted from the SMALL data type to the BIG data type. If the sum of the current total_size and the delta is less than or equal to the target expanded size, then the object is converted from the SMALL data type to the BIG data type, the total_size is incremented by delta, and the iterative loop continues with the next largest object in the sorted list. If not, the technique ends.

FIG. 7A illustrates a table 700 of example objects in a mixed precision ML model, according to one embodiment. In an embodiment, FIG. 7A illustrates objects in the example ML model resnet_152. Many ML models, including resnet_152, include numerous layers with small weights or BLOBs, so that no significant bandwidth is saved by representing these objects as a smaller data type. The techniques discussed above in relation to FIGS. 3-6 promote these smaller objects from the smaller data type (e.g., 8-bit integer) to the larger data type (e.g., 12-bit integer). A user can apply these techniques for a set of target bandwidth increases of his or her choosing, and can pick the lowest bandwidth increase that produces acceptable results (e.g., acceptable accuracy).

For example, a user can use a given target bandwidth and then evaluate the effectiveness of the ML model (e.g., a neural network) using the new objects. The user can test the accuracy of inference of the neural network (e.g., the accuracy of the result inferred by the neural network from one or more inputs) and compare this with accuracy criteria. This is merely one example of an effectiveness criteria, and other criteria can be used (e.g., speed, processing load, etc.). If the evaluated neural network does not meet the effectiveness criteria, the algorithm can be run again with a modified target bandwidth increase and the neural network can be modified and tested again. This process can be repeated until the neural network meets the effectiveness criteria (e.g., comparing the accuracy of the neural network to a threshold value).

The table 700 illustrates the resnet_152 ML model after conversion to a mixed precision implementation using the techniques discussed above in FIGS. 3-6. As an example, resnet_152 loses significant accuracy when all objects are converted from floating-point to 8-bit integer. But when a bandwidth increase of 14% over the 8-bit integer representation is allowed, as shown in table 700, the results come very close to the results if all objects were represented using 12-bit integers (which would require a 50% increase in bandwidth).

Column 702 in the table 700 depicts the object number (e.g., label). In an embodiment, the resnet_152 model includes 368 weights and BLOBs, a selection of which are illustrated in the table 700. Column 704 depicts the size of the object in a given row, if the object is represented as an 8-bit data type (e.g., an 8-bit integer). Column 706 depicts the total sum of object size up to a given row (e.g., from object 1 to the given row) if all objects are represented as the 8-bit data type. Column 708 depicts the percentage of the overall object size for the model used by objects up to the given row.

Column 710 depicts the object size in the mixed precision implementation (e.g., after updating a selection of the objects from the 8-bit to the 12-bit data type). Column 712 depicts the updated object size in the mixed precision implementation. Column 714 depicts the updated total sum of objects up to the given row. Object 716 depicts the percentage of the overall object size for the model used by updated objects up to the given row. Column 718 depicts the total expansion of the size of the objects in the model, after updating, up to the given row. And column 720 depicts the object type (e.g., BLOB or weight).

For example, as illustrated in the table 700, objects 1-10 (e.g., depicted in rows 1-10) are all relatively small and are converted from an 8-bit data type to a 12-bit data type in the mixed precision implementation, with relatively little impact on the overall object size. In fact, the first 231 objects are converted from the 8-bit data type to the 12-bit data type, while objects 232-368 remain as the 8-bit data type. This results in a total expansion of 1.139 (e.g., 13.9%), as illustrated in column 718 at row 368 (i.e., the last row).

Figure 7B:
FIG. 7B illustrates a table of example objects in a further mixed precision ML model, according to one embodiment.

FIG. 7B illustrates a table 750 of example objects in a further mixed precision ML model, according to one embodiment. In an embodiment, FIG. 7B illustrates objects in the example ML model mobilenet_ssd, a scene segmentation and classification model that computes boxes that surround objects (e.g., segmentation) and classifies the content of each box as one of 90 different objects. As illustrated, a 10% increase in bandwidth (e.g., size) over the fully 8-bit representation produces results that are effectively as good as converting all objects to 12-bit representation.

Just as in the table 700 illustrated in FIG. 7A, column 702 in the table 750 depicts the object number (e.g., label). In an embodiment, the mobilenet_ssd includes 111 weights and BLOBs, a selection of which are illustrated in the table 750. Column 704 depicts the size of the object in a given row, if the object is represented as an 8-bit data type (e.g., an 8-bit integer). Column 706 depicts the total sum of object size up to a given row (e.g., from object 1 to the given row) if all objects are represented as the 8-bit data type. Column 708 depicts the percentage of the overall object size for the model used by objects up to the given row.

Column 710 depicts the object size in the mixed precision implementation (e.g., after updating a selection of the objects from the 8-bit to the 12-bit data type). Column 712 depicts the updated object size in the mixed precision implementation. Column 714 depicts the updated total sum of objects up to the given row. Object 716 depicts the percentage of the overall object size for the model used by updated objects up to the given row. Column 718 depicts the total expansion of the size of the objects in the model, after updating, up to the given row. And column 720 depicts the object type (e.g., BLOB or weight).

For example, as illustrated in the table 750, objects 1-7 (e.g., depicted in rows 1-7) are all relatively small and are converted from an 8-bit data type to a 12-bit data type in the mixed precision implementation, with relatively little impact on the overall object size. In fact, the first 81 objects are converted from the 8-bit data type to the 12-bit data type, while objects 82-111 remain as the 8-bit data type. This results in a total expansion of 1.095 (e.g., 9.5%), as illustrated in column 718 at row 111 (i.e., the last row).

In an embodiment, target bandwidth increases vary by implementation. For example, for 8 and 12-bit values increments of 5% can be used, from 105% to 150%. This is merely one example. Further, in an embodiment, after a promising result has been selected using the initial percentage increments (e.g., 5% percent increments) the target bandwidth increase can be varied around the result. For example, if 115% appears to be a promising result, the techniques illustrated above with regard to FIGS. 3-6 can check 113%, 114%, 116%, and 117%.

In an embodiment, one or more of the techniques described above can be used to tune a trained neural network, to increase the efficiency of inference operations by the neural network. For example, the algorithm described above can be used to tune a trained neural network to determine the bit sizes to use for the various weights and BLOBs in the trained neural network. Alternatively, or in addition, one or more of the techniques described above can be used to tune training of a neural network. For example, one or more of the techniques described above can be used for quantization aware training of an ML model.

Figure 8:
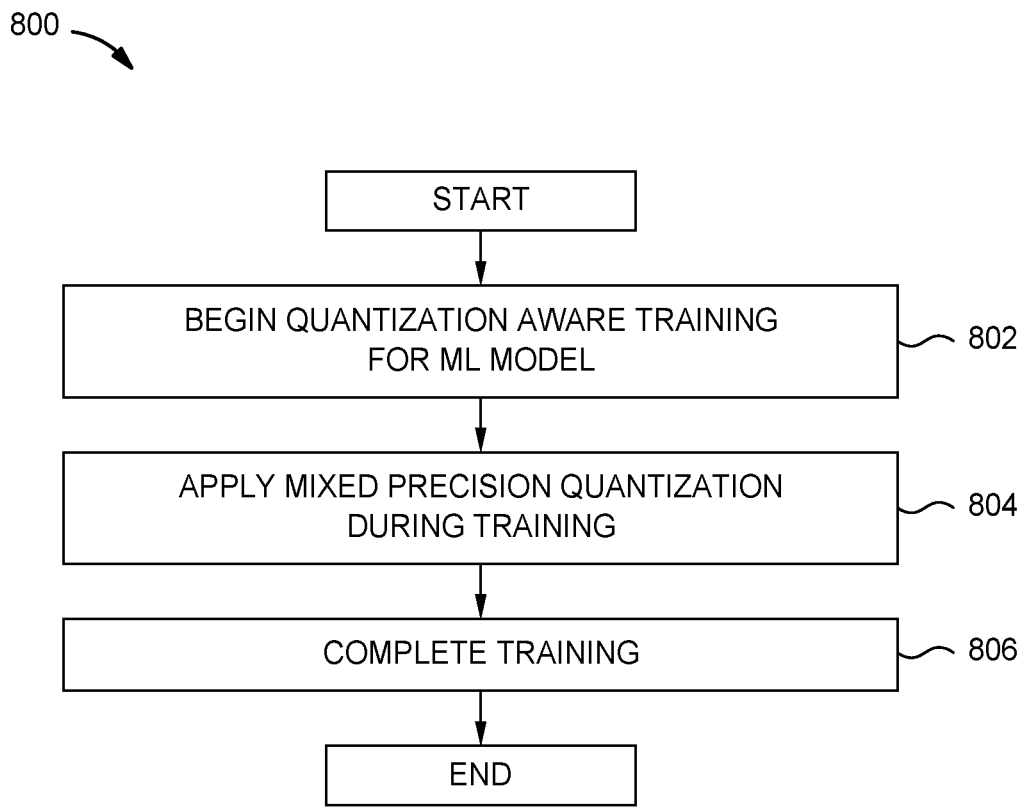
FIG. 8 is a flowchart for mixed precision quantization aware training, according to one embodiment.

FIG. 8 is a flowchart 800 for mixed precision quantization aware training, according to one embodiment. In an embodiment, converting an initial ML model to an updated ML model using different data types (e.g., converting floating-point objects to smaller integer objects) can be referred to as quantization. Quantization aware training can be used to take into account quantization during training of an ML model, to increase the accuracy of inference using the eventual trained ML model. In an embodiment, quantization aware training simulates low-precision inference-time computation in the forward pass of the training process. For example, quantization error can be introduced as noise during training and as part of the overall loss (e.g., which an optimization algorithm can try to minimize). The ML model can then learn parameters that are more robust to quantization.

In an embodiment, the mixed precision techniques described above with regard to FIGS. 3-6 can be used to improve quantization aware training. At block 802, an ML training service (e.g., the ML training service 112 illustrated in FIG. 2) begins quantization aware training. In an embodiment, any suitable technique can be used.

At block 804, the ML training service applies mixed precision quantization during training. For example, the quantization aware training can be designed to introduce quantization error for mixed precision, as opposed to single precision, quantization during training. The techniques described above with regard to FIGS. 3-6 can be used to determine mixed precision implementations and appropriate error values (e.g., to introduce as noise during training). The quantization aware training can then use these error values to train the ML model to be robust to mixed precision quantization. At block 806, the ML training service completes training.

Figure 9:
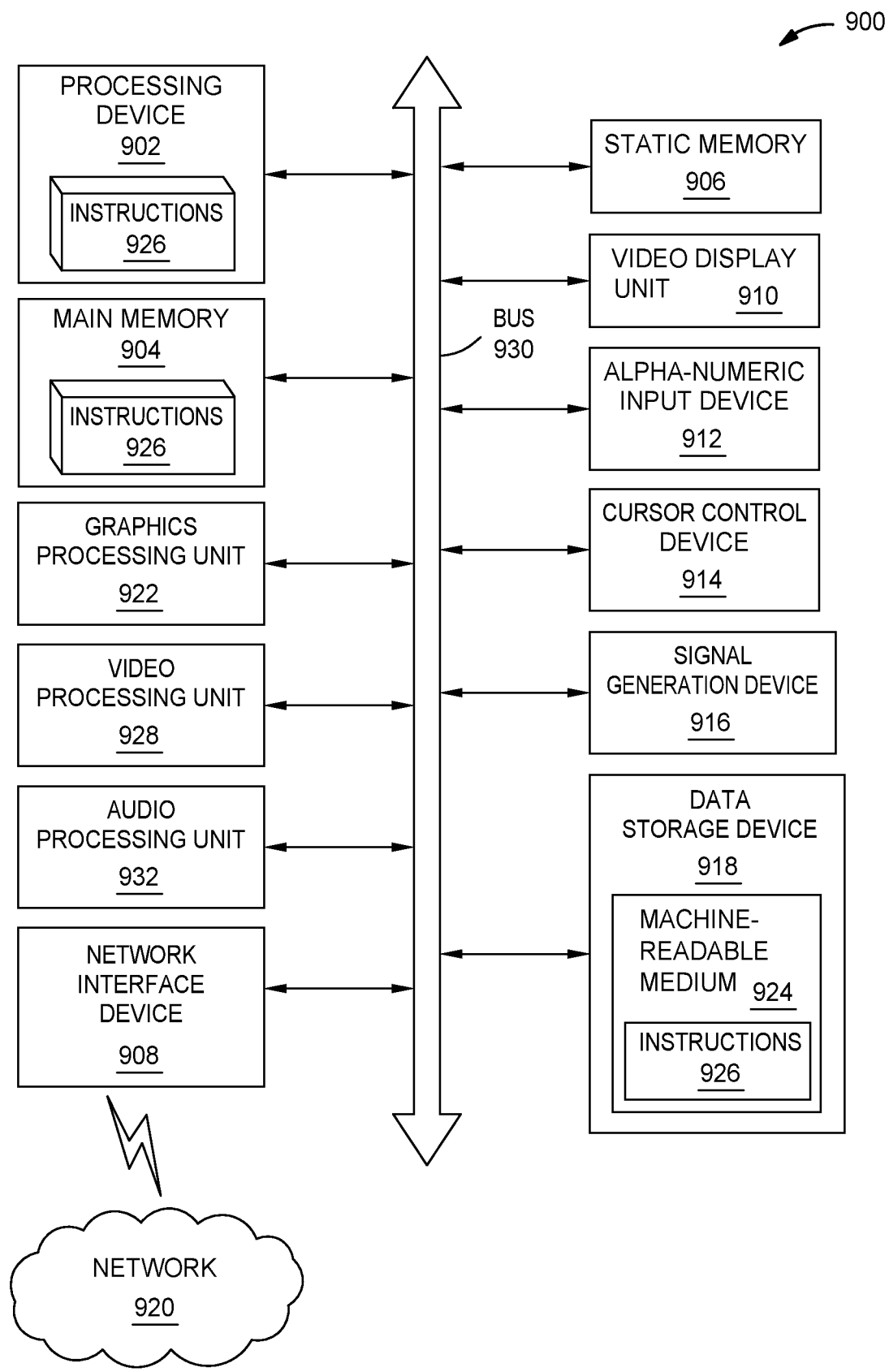
FIG. 9 illustrates an abstract diagram of an example computer system in which examples of the present disclosure may operate, according to one embodiment.

FIG. 9 illustrates an example of a computer system 900 within which a set of instructions, for causing the computer system to perform any one or more of the methodologies discussed herein, may be executed. In some implementations, the computer system may be connected (e.g., networked) to other machines or computer systems in a local area network (LAN), an intranet, an extranet, and/or the Internet. The computer system may operate in the capacity of a server or a client computer system in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that computer system. Further, while a single computer system is illustrated, the term computer system shall also be taken to include any collection of computer systems that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930. The main memory 904 includes or is a non-transitory computer readable medium. The main memory 904 (e.g., a non-transitory computer readable medium) can store one or more sets of instructions 926, that when executed by the processing device 902, cause the processing device 902 to perform some or all of the operations, steps, methods, and processes described herein.

Processing device 902 represents one or more processors such as a microprocessor, a central processing unit, or the like. More particularly, the processing device 902 may be or include complex instruction set computing (CISC) microprocessor, reduced instruction set computing (RISC) microprocessor, very long instruction word (VLIW) microprocessor, a processor implementing other instruction sets, or processor(s) implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing some or all of the operations, steps, methods, and processes described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (e.g., a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also including machine-readable storage media.

In some implementations, the instructions 926 include instructions to implement functionality described above. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the computer system and that cause the computer system and the processing device 902 to perform any one or more of the methodologies described above. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

In view of the foregoing, the scope of the present disclosure is determined by the claims that follow.

What is claimed is:

1. A method comprising:
   receiving a target bandwidth increase for a machine learning (ML) model comprising a plurality of objects of a first data type represented by a first number of bits, wherein the target bandwidth increase relates to changing a first portion of the plurality of objects to a second data type represented by a second number of bits different from the first number of bits and changing a second portion of the plurality of objects to a third data type represented by a third number of bits different from both the first and second numbers of bits;
   sorting the plurality of objects in the ML model based on bandwidth, comprising:
      identifying, for a first object of the plurality of objects in the ML model, a total bandwidth of all instances of the first object in the ML model;
   identifying both: (i) the first portion of the plurality of objects in the ML model to change from the first data type to the second data type and (ii) the second portion of the plurality of objects in the ML model to change from the first data type to the third data type, based on the target bandwidth increase and the sorting of the plurality of objects, comprising:
      selecting both the first portion and the second portion, from among the plurality of objects, based on maintaining a total bandwidth for the ML model at or below the target bandwidth increase and using the sorted plurality of objects; and
   changing, by a processor and based on the selecting both the first portion and the second portion, the first portion of the plurality of objects from the first data type to the second data type and the second portion of the plurality of objects from the first data type to the third data type.

2. The method of claim 1, wherein the ML model comprises a neural network, and wherein the plurality of objects comprises a plurality of weights and a plurality of binary large objects (BLOBs).

3. The method of claim 1, wherein the first data type comprises a floating point data type, wherein the second data type comprises a first integer data type, and wherein the third data type comprises a second integer data type.

4. The method of claim 1, wherein the sorting the plurality of objects in the ML model based on bandwidth comprises sorting the plurality of objects based on size.

5. The method of claim 4, wherein the ML model comprises a neural network, and wherein sorting the plurality of objects in the ML model is further based on proximity of the respective objects to a root of a network graph representing the neural network.

6. A system comprising:
   a processor; and
   a memory storing instructions, which when executed by the processor, cause the processor to perform operations comprising:
      receiving a target bandwidth increase for a neural network comprising a plurality of binary large objects (BLOBs) and weights of a first data type represented by a first number of bits, wherein the target bandwidth increase relates to changing a first portion of the plurality of BLOBs and weights to a second data type represented by a second number of bits different from the first number of bits and changing a second portion of the plurality of BLOBs and weights to a third data type represented by a third number of bits different from both the first and second numbers of bits;
      identifying both: (i) the first portion of the plurality of BLOBs and weights in the neural network to change from the first data type to the second data type and (ii) the second portion of the plurality of BLOBs and weights in the neural network to change from the first data type to the third data type, based on the target bandwidth increase, comprising:
         identifying, for a first BLOB or weight and a second BLOB or weight of the plurality of BLOBs and weights in the neural network, a total bandwidth of all instances of the first BLOB or weight in the neural network; and
         selecting both the first portion and the second portion, from among the plurality of BLOBs and weights, based on maintaining a total bandwidth for the neural network at or below the target bandwidth increase and the identified first BLOB or weight and second BLOB or weight; and
      changing, based on the selecting both the first portion and the second portion, the first portion of the plurality of BLOBs and weights from the first data type to the second data type and the second portion of the plurality of BLOBs and weights from the first data type to the third data type.

7. The system of claim 6, wherein the operations further comprise:
   sorting the plurality of BLOBs and weights in the neural network based on bandwidth,
      wherein the sorting comprises the identifying, for the first BLOB or weight of the plurality of BLOBs and weights in the neural network, the total bandwidth of all instances of the first BLOB or weight in the neural network, and
      wherein the identifying the first portion of the plurality of BLOBs and weights to change from the first data type to the second data type and the identifying the second portion of the plurality of BLOBs and weights to change from the first data type to the third data type is further based on the sorting of the plurality of BLOBs and weights.

8. The system of claim 7, wherein the first data type comprises a floating point data type, wherein the second data type comprises first integer data type, and wherein the third data type comprises a second integer data type.

9. The system of claim 6, the operations further comprising:
   determining that the neural network does not meet an effectiveness criteria after the changing the first portion of the plurality of BLOBs and weights from the first data type to the second data type, and in response:
      modifying the target bandwidth increase;
      identifying a third portion of the plurality of BLOBs and weights, different from the first portion of the plurality of BLOBs and weights, to change from the first data type to the second data type, based on the modified target bandwidth increase; and changing the third portion of the plurality of BLOBs and weights from the first data type to the second data type.

10. A non-transitory computer readable medium comprising stored instructions, which when executed by a processor, cause the processor to perform operations comprising:

receiving a target performance change for a machine learning (ML) model comprising a plurality of objects of a first data type represented by a first number of bits, wherein the target performance change relates to changing a first portion of the plurality of objects to a second data type represented by a second number of bits different from the first number of bits and changing a second portion of the plurality of objects to a third data type represented by a third number of bits different from both the first and second numbers of bits;

sorting the plurality of objects in the ML model based on size, comprising:

identifying, for a first object of the plurality of objects in the ML model, a total size of all instances of the first object in the ML model;

identifying both: (i) the a first portion of the plurality of objects in the ML model to change from the first data type to the second data type and (ii) the second portion of the plurality of objects in the ML model to change from the first data type to the third data type, based on the target performance change and the sorting the plurality of objects, comprising:

selecting both the first portion and the second portion, from among the plurality of objects, based on maintaining performance for the ML model to meet the target performance change and using the sorted plurality of objects;

changing, based on the selecting both the first portion and the second portion, the first portion of the plurality of objects from the first data type to the second data type and the second portion of the plurality of objects from the first data type to the third data type; and using the ML model, comprising the first portion of the plurality of objects changed to the second data type and the second portion of the plurality of objects changed to the third data type, to infer a result from one or more inputs.

11. The non-transitory computer readable medium of claim 10, wherein the ML model comprises a neural network, and wherein the plurality of objects comprises a plurality of weights and a plurality of binary large objects (BLOBs).

12. The non-transitory computer readable medium of claim 10, wherein the first data type comprises a floating-point data type, wherein the second data type comprises a first integer data type, and wherein the third data type comprises a second integer data type.

13. The non-transitory computer readable medium of claim 12, wherein the floating-point data type comprises a 32 bit floating-point data type, the first integer data type comprises a 12 bit integer data type, and the second integer data type comprises an 8 bit integer data type.

14. The non-transitory computer readable medium of claim 10, wherein the ML model comprises a neural network, and wherein the sorting the plurality of objects in the ML model is further based on proximity of the respective objects to a root of a network graph representing the neural network.

15. The method of claim 1, wherein the third data type comprises more bits than the second data type and fewer bits than the first data type, and wherein selecting both the first portion and the second portion comprises:

determining a total bandwidth for the ML model based on changing the plurality of objects to the second data type; and iteratively identifying one or more of the plurality of objects to change to the third data type, instead of the second data type, based on the target bandwidth increase.

16. The system of claim 6, wherein the third data type comprises more bits than the second data type and fewer bits than the first data type, and wherein selecting both the first portion and the second portion comprises:

determining a total bandwidth for the neural network based on changing the plurality of objects to the second data type; and iteratively identifying one or more of the plurality of objects to change to the third data type, instead of the second data type, based on the target bandwidth increase.

17. The non-transitory computer readable medium of claim 10, wherein the third data type comprises more bits than the second data type and fewer bits than the first data type, and wherein selecting both the first portion and the second portion comprises:

determining a total performance for the ML model based on changing the plurality of objects to the second data type; and iteratively identifying one or more of the plurality of objects to change to the third data type, instead of the second data type, based on the target performance change.

\* \* \* \* \*